May 29, 1934.   H. G. O. PHILLIPS   1,960,395
AMUSEMENT APPARATUS
Filed April 14, 1932   2 Sheets-Sheet 1
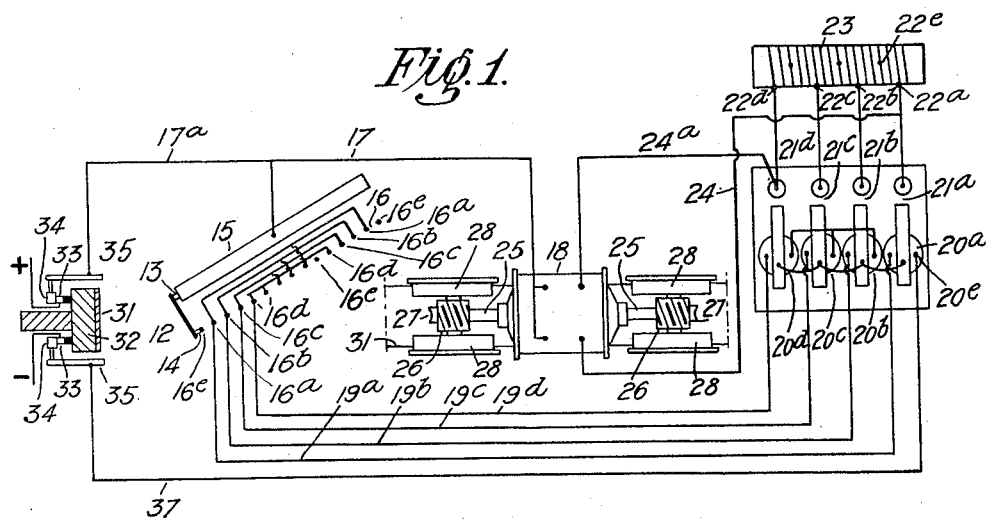
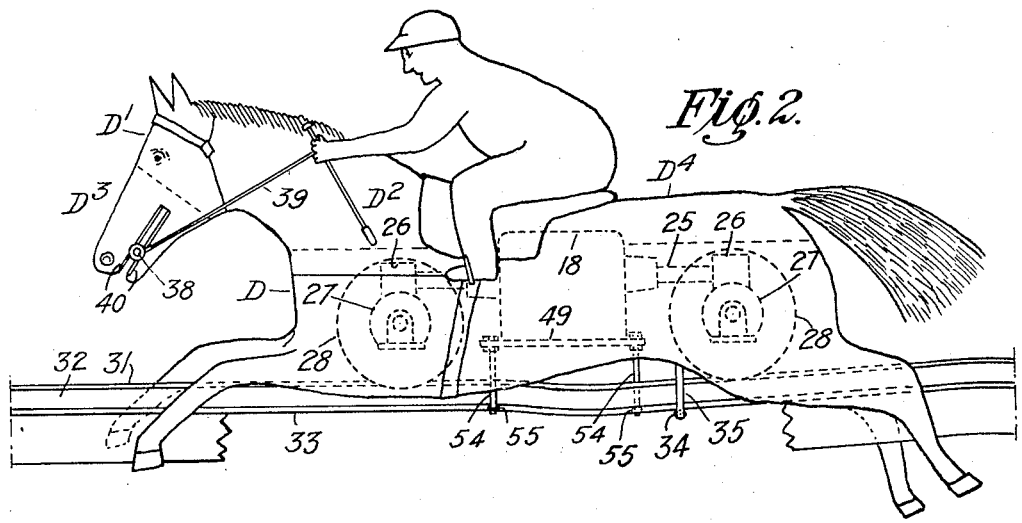
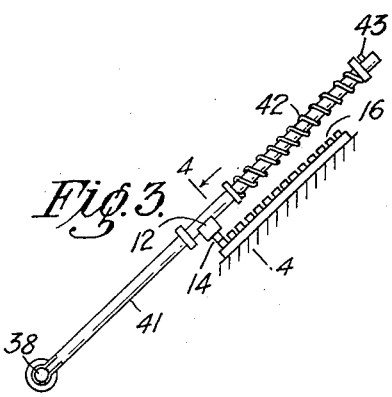
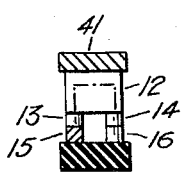
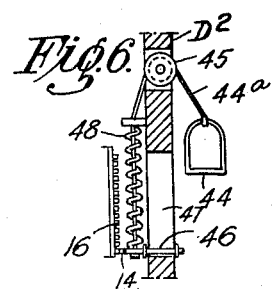
Hector Graham Oliver Phillips
INVENTOR;
By (signature)
his Attorney May 29, 1934.  H. G. O. PHILLIPS  1,960,395
AMUSEMENT APPARATUS
Filed April 14, 1932    2 Sheets-Sheet 2
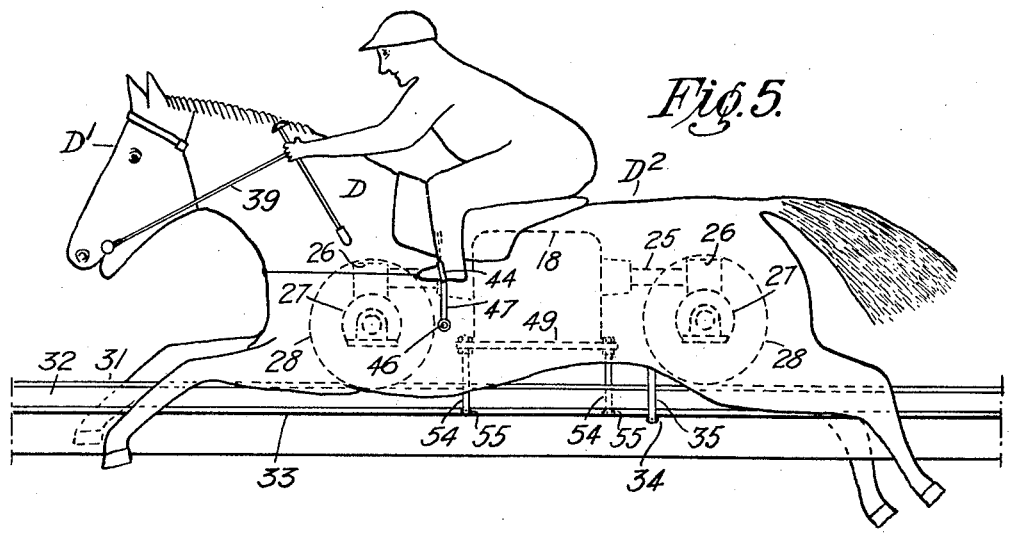
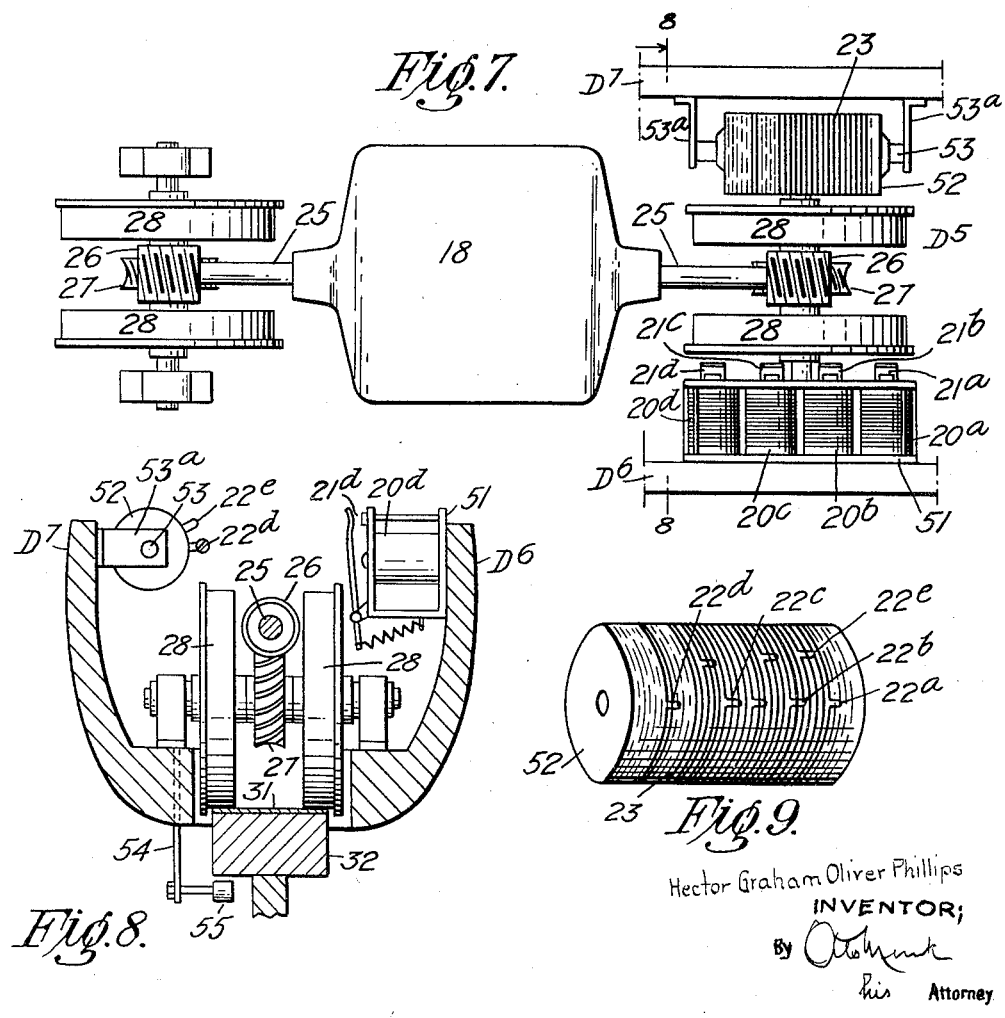
Hector Graham Oliver Phillips
INVENTOR;
By
his Attorney Patented May 29, 1934

1,960,395

UNITED STATES PATENT OFFICE 1,960,395

AMUSEMENT APPARATUS

Hector Graham Oliver Phillips, St. Kilda, Victoria, Australia

Application April 14, 1932, Serial No. 605,221
In Australia April 17, 1931

2 Claims. (Cl. 104—61)

This invention relates to amusement apparatus of the type which includes electrically operated carriers for one or more passengers.

According to this invention each carrier is provided with control means adapted to be operated by a passenger so that the carrier will be caused to travel at speeds which increase or decrease erratically and unexpectedly with, at will, intermittent and unexpected stoppages, the arrangement being such that the passenger cannot ascertain what would be the result of further operation of the control means.

Amusement apparatus may include a series of carriers each fitted with control means of the type described and each adapted to travel over a predetermined course, for example along one of a series of parallel tracks, and passengers may race toward a terminal point, thus promoting enthusiasm and interest of both passengers and onlookers.

In order that this invention may be more readily understood a practical application thereof will now be described with reference to the accompanying drawings in which a dummy horse is shown by way of example; the carrier may be any other dummy animal or model of a motor car or other passenger carrier.

In the drawings:

Figure 1 is a diagram showing electrical circuits.

Figure 2 is a side elevation showing a dummy animal having rein operated control devices.

Figure 3 is a detail view showing electrical contacts and associated parts for the construction shown in Figure 2.

Figure 4 is a transverse section on the line 4—4 of Figure 3 but on a larger scale.

Figure 5 is a side elevation showing a dummy animal having stirrup operated control devices.

Figure 6 is a sectional view showing electrical contacts and associated parts for the construction shown in Figure 5.

Figure 7 is a plan view showing the driving motor and associated parts.

Figure 8 is a transverse section on line 8—8 of Figure 7.

Figure 9 is a perspective view showing a resistance on a larger scale.

A movable member 12 of insulating material has fixed to it electrically connected contacts 13, 14. Contact 13 is adapted to be moved relatively to an elongated contact 15 and contact 14 is adapted to be moved over a series of contacts 16. Contact 15 is connected by a lead 17 to suitable terminals on a motor 18 and some of contacts 16 are so connected that when they are in circuit the motor will be driven at different speeds. Live contacts $16^a$, $16^b$, $16^c$, and $16^d$ are connected by respective leads $19^a$, $19^b$, $19^c$, and $19^d$ to respective solenoids $20^a$, $20^b$, $20^c$, and $20^d$ adapted to operate switches $21^a$, $21^b$, $21^c$ and $21^d$ which are in turn connected by respective leads to terminals $22^a$, $22^b$, $22^c$ and $22^d$ on a resistance coil 23. From leads $22^a$ and $22^d$ connections 24 and $24^a$ extend to suitable terminals on motor 18. Other terminals such as $22^e$ on coil 23 are usable at will to provide different speeds.

Contacts $16^e$ are dead so that location of movable contact 14 on any such contact results in an open circuit and stoppage of the motor 18. Contacts $16^a$ may correspond with quarter speed, contacts $16^b$ with half speed, and contacts $16^c$ and $16^d$ with three-quarter speed and full speed respectively, all contacts inter-connected and joined in the same circuit giving the same result. By varying the connections to the terminals the sequences may be changed at will.

The motor 18 has front and rear shafts 25 each of which carries a worm 26 in mesh with a worm wheel 27 which drives a pair of wheels 28. When wheels 28 are flanged they may travel on a rail 31.

Current may be supplied in any suitable manner. For example there is, below rail 31, a beam 32 below which are live rails 33 on each of which bears a contact roller 34 carried by a bracket 35 extending from a passenger carrier. Rollers 34 are electrically connected by leads $17^a$ and 37 to respectively, contact 15 and the common terminal $20^e$ of the solenoid switches before mentioned.

When the invention is applied to a dummy animal D the control apparatus may be located in the head $D^1$ (Figure 2) or the body $D^2$ (Figure 5). To facilitate alteration of connections and to render parts within the head of the dummy easily accessible a section $D^3$ thereof is removable and is held in position by screws or other suitable means.

In the construction shown in Figure 2 the member 12 is controlled by a cross bar 38 to which reins 39 are connected and which is slidable in a slot between guides 40. Bar 38 has connected to it (Figure 3) a slidable rod 41 which carries member 12.

Tension on the reins causes bar 38 to slide between guides 40 and move rod 41 causing contacts 13 and 14 to slide over fixed contacts 15 and 16. Rod 41 is actuated toward a normal or open-circuit position by a spring 42 a stop 43 limiting such movement.

When the operation is by means of a stirrup 44 (Figures 5 and 6) a connection 44ª extends over a guide 45 to a slidable member 46 in a slot 47 in the body D². Member 46 carries contacts 13 and 14 and is influenced toward normal position by a spring 48.

The motor 18 and associated parts are supported in any convenient manner in a cavity D⁵ within the dummy body. As shown the motor is on a bedplate 49 fixed at the cavity base and the wheels 28 project through a slot in said base and engage the supporting rail 31 which is preferably elevated. The solenoids 20ª, 20ᵇ, 20ᶜ and 20ᵈ and their switches 21ª, 21ᵇ, 21ᶜ, and 21ᵈ are mounted in a frame 51 fixed to a cavity wall D⁶ while the resistance 23 is wound on a grooved cylinder 52 which is mounted on a rod 53 supported in brackets 53ª extending from another wall D⁷ of said cavity.

To render the mechanism and electrical devices within the body of the dummy D readily accessible the upper part D⁴ thereof is removable and is normally held in position by screws or bolts or other suitable means.

To prevent accidental displacement of the dummy from the rail, guards are provided at each side thereof. Brackets 54 extend downwardly from the body of the dummy and each carries at its lower end a roller 55 which normally travels freely below the beam 32 but is so located that if rocking movement occurs one or the other of said rollers will meet the beam and prevent the dummy capsizing.

Track 31 may undulate as in Figure 2 or be flat as in Figure 5. Undulating tracks assist the reproduction of life-like movement. When tracks are arranged to enable competitors to race they may be parallel or concentric or have other suitable form but when they are curved arrangements they are made to ensure that all competitors will have an equal chance. For example the sizes of wheels 28 are suitably varied.

When a passenger moves member 12 by pulling the reins 39 or pressing on a stirrup 44 so that the contact 14 meets one of the live contacts 16ª, 16ᵇ, 16ᶜ or 16ᵈ a circuit will be closed and the motor will be operated and the dummy will travel at a corresponding speed. Further operation of member 12 so that the circuit is closed through another contact may result in increased or decreased speed but if the contact 14 reaches a contact 16ᵉ the circuit will be broken and the motor will stop. The efforts of the passenger will be directed toward attaining and holding the highest speed but considerable skill will be required to do this, particularly when the sequence of the connections to contacts 16ª, 16ᵇ, 16ᶜ, and 16ᵈ are changed from time to time.

I claim:

1. In an amusement apparatus, in combination, a passenger carrier having a hollow body and an opening at the lower part thereof to accommodate a track, an electric motor mounted within said body, a pair of flanged wheels forwardly of said motor and another pair of wheels rearwardly thereof, transmission means to convey motion from the motor to said wheels, a track engaged by said wheels, an electric conductor below said track, contact means extending from said body to convey current from said conductor to said motor, shafts extending forwardly and rearwardly from the driving motor, worm gearing connecting each shaft to a counter shaft, a track comprising a single rail and a pair of wheels on each counter shaft to engage opposite sides of said rail, and control means associated with the motor and operated by a passenger whereby the speed of the motor is caused to increase or decrease progressively or erratically.

2. In amusement apparatus, a dummy animal having a hollow body, a removable section in said body, an opening at the base of said body to accommodate a track, a driving motor supported in said body near the base thereof, shafts extending in opposite directions from said motor, a worm on each shaft, a worm wheel driven by said worm, a pair of flanged wheels on each worm wheel shaft, said wheels being located in the opening at the body base, a track extending through said opening and engaged at each side by the supporting wheels, a series of solenoid controlled switches mounted in said hollow body, a resistance having a series of terminals mounted in said hollow body, a series of fixed contacts within the dummy animal, a movable contact, and means whereby a passeneger may actuate the movable contact.

HECTOR GRAHAM OLIVER PHILLIPS.